Nov. 13, 1934.  H. H. ROBINSON  1,980,699
ORIFICE METER FITTING
Filed Feb. 29, 1932  3 Sheets-Sheet 1
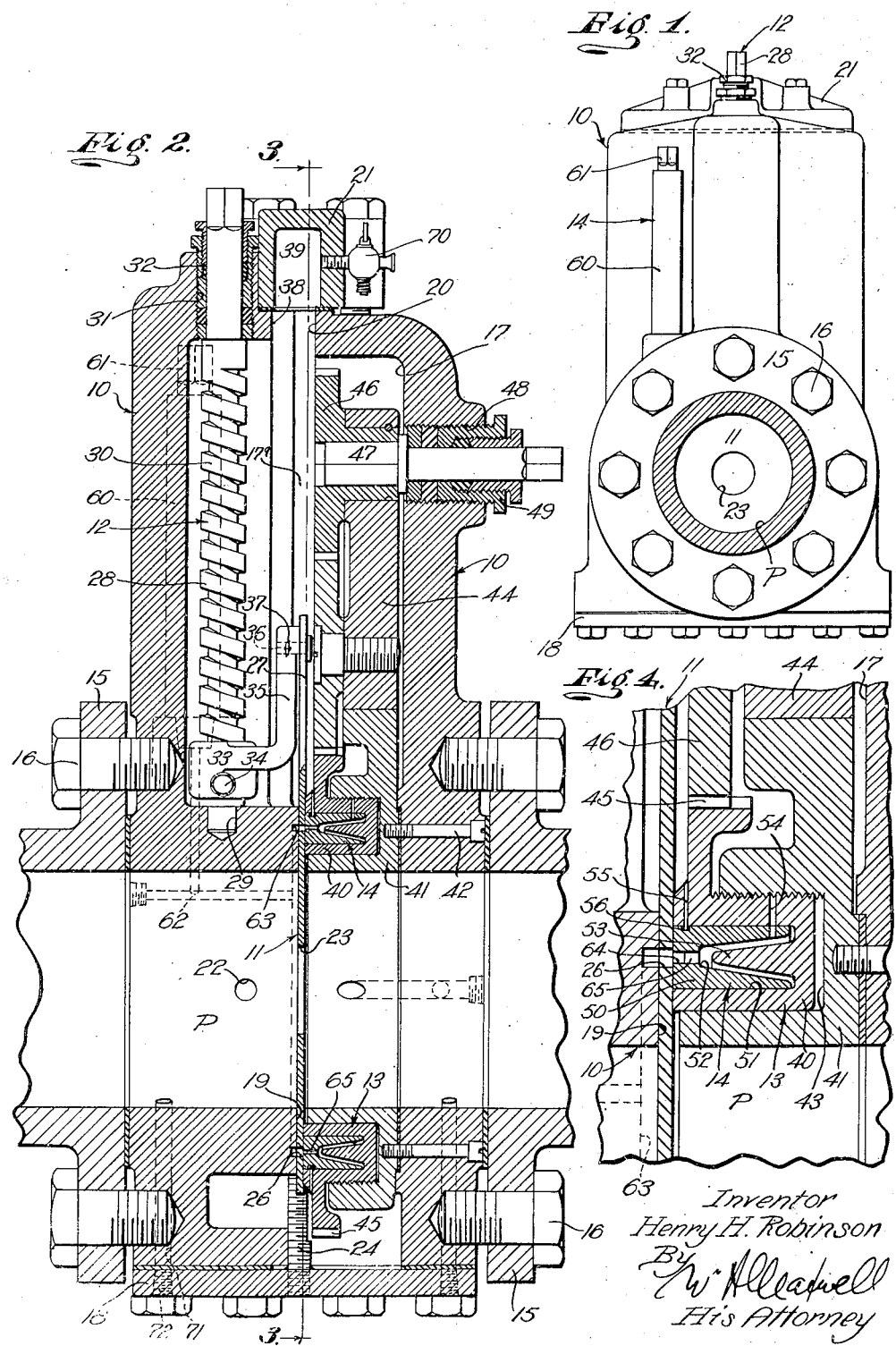
Inventor
Henry H. Robinson
By W. Cadwell
His Attorney

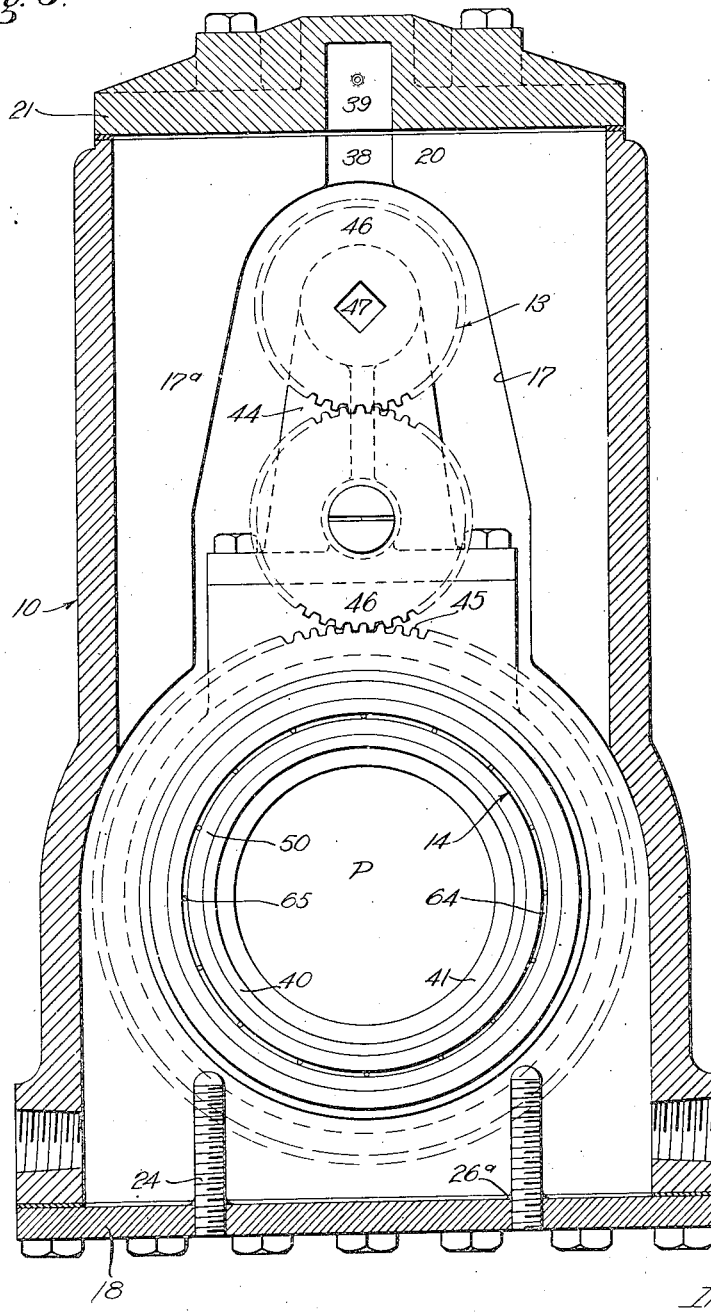

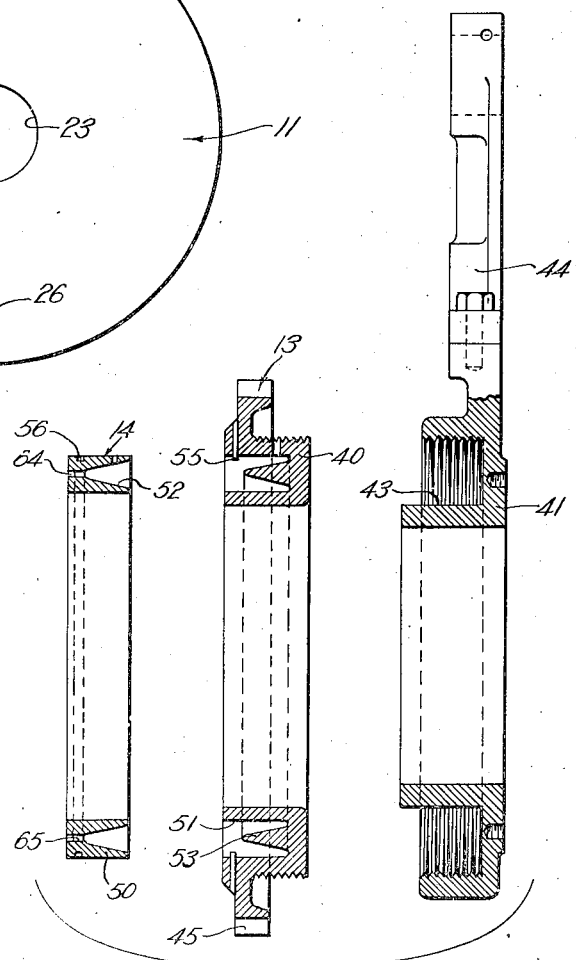

Patented Nov. 13, 1934

1,980,699

UNITED STATES PATENT OFFICE 1,980,699

ORIFICE METER FITTING

Henry H. Robinson, Los Angeles, Calif.

Application February 29, 1932, Serial No. 595,845

17 Claims. (Cl. 137—75)

This invention has to do with orifice meters for metering the flow of fluid through conduits, and relates more particularly to orifice meter fittings embodying orifice discs for arrangement in fluid conduits. A general object of the invention is to provide a simple, practical and improved orifice meter fitting in which the chamber in the body into which the orifice plate is shifted for replacement is effectively sealed from the fluid conduit during replacement of the plate, etc., and in which the orifice disc or plate is effectively sealed about when in position across the fluid conduit.

The orifice discs or plates employed in orifice meter fittings must be replaced quite frequently because of wear, variations in conditions of flow through the conduit, etc. Considerable difficulty has been encountered in providing an orifice meter fitting in which the orifice plate may be readily replaced and that is capable of sealing about the fluid conduit without cutting off the flow during replacement of the plate, and of making a tight seal about the plate when in position across the fluid conduit.

An object of this invention is to provide an orifice meter fitting that embodies three agencies or means for sealing off the fluid passage from the body chamber during replacement of the orifice plate and that are operable to seal about the orifice plate when in position across the fluid passage. The invention includes a mechanical means and a fluid pressure means for effecting a tight seal about the fluid passage and disc, and further involves the presence of a liquid under pressure at the sealing parts to form a liquid seal about the parts and plate.

It is another object of the invention to provide an orifice fitting of the character mentioned in which the three means or agencies for sealing off the body chamber from the fluid passage and for sealing about the orifice disc are simple and easy to operate, and are compact in construction.

It is another object of the invention to provide an orifice meter fitting of the character mentioned in which the principal or active elements of the fluid pressure sealing means are carried by the mechanical sealing means.

It is another object of the invention to provide a novel and improved gear means for actuating the mechanical means for closing off the body chamber and for clamping against and sealing about the orifice plate.

It is another object of the invention to provide a simplified and effective means for shifting the orifice plate between the operating position across the fluid passage and a position where it is accessible for replacement.

It is another object of the invention to provide an orifice meter fitting of the character mentioned in which the liquid employed in the fluid pressure sealing means and for providing the liquid seal about the fluid passage and orifice plate may be in the nature of a lubricant for lubricating the various parts of the fitting.

It is a further object of the invention to provide an orifice meter fitting of the character mentioned that consists of a compact and effective assemblage of parts in which the housing or body may be a single member or casting that carries and houses the various elements so that the operating members of the sealing means and the orifice plate shifting means are readily accessible for engagement and operation.

Further objects and features of the invention will be best and more fully understood from the following detailed description of a typical form and application of the invention, throughout which description, reference is had to the accompanying drawings, in which:

Fig. 1 is an end view of the fitting provided by the present invention. Fig. 2 is an enlarged central vertical detailed sectional view of the fitting showing the orifice plate in position across the fluid passage and illustrating the sealing means in the operative positions. Fig. 3 is a vertical detailed sectional view taken substantially as indicated by line 3—3 on Fig. 2. Fig. 4 is an enlarged fragmentary detailed sectional view of a portion of the sealing means and the parts immediately adjacent. Fig. 5 is a side elevation of the orifice plate and the travelling nut. Fig. 6 is a vertical sectional view of the principal parts of the sealing means showing them apart from the other elements of the device.

The orifice meter fitting provided by the present invention includes, generally, a housing or body 10 adapted to be mounted or interposed in a conduit, an orifice disc or plate 11, means 12 for shifting the orifice plate 11 between a position across the conduit opening and a position where it is accessible for replacement, mechanical means 13 for closing off the fluid conduit during replacement of the plate and for clamping the orifice plate 11 in position, and for sealing about the plate when it is in position across the fluid passage, and fluid pressure means 14 for sealing about the fluid passage and orifice plate.

In accordance with the invention, the housing or body 10 may be in the form of a single unitary casting. The body 10 is provided with an opening or passage P for registering with the fluid opening of the conduit or pipe line. The passage P is of round cross section and is located adjacent, what I will term, the lower end of the body 10. In accordance with the broader principles of the invention, the body may be mounted or connected in the conduit in any suitable manner. In the particular case illustrated in the drawings, flanges 15 are provided at the ends of the pipe sections and bolts 16 extend through openings in the flanges 15 and are threaded into openings in the body to connect the body in the pipe line. The body 10 extends or projects a considerable distance upwardly from the passage P and is provided with an opening or chamber 17 intersecting the fluid passage P. The chamber 17 is provided to carry the orifice plate 11, the plate operating means 12 and the sealing means 13 and 14. The lower end portion of the chamber 17 is flared or enlarged, and a plate 18 closes the lower end of the chamber. An annular seat 19 is provided on a wall of the chamber 17 and surrounds the fluid passage P. The annular seat 19 is adapted to be sealed by the sealing means 13 and 14 and to seal with the orifice plate 11. The seat 19 is preferably flat and normal to the longitudinal axis of the fluid passage P. The side or edge portions 17a of the chamber are comparatively narrow to effectively guide the orifice plate 11 for vertical movement. The chamber 17 extends to the upper end of the body 10 where it is restricted to a comparatively narrow opening or slot 20 passing through the upper wall of the body. The slot 20 is proportioned to readily pass the orifice plate 11 and is normally closed by a removable cover 21. A relief valve 70 may be provided on the cover 21 to allow fluid pressure in the chamber 17 to be exhausted. Openings 22 are provided to communicate with the fluid passage P at opposite sides of the chamber 17. The openings 22 are provided to receive pipes connecting with a suitable instrument (not shown) for indicating the differential in pressure at opposite sides of the orifice disc 11. Drain openings 71 normally closed by removable plugs 72 are provided in the lower wall of the body 10 to permit any accumulations of liquid to be drained from the passage P at either side of the plate 11.

The orifice disc or plate 11 is adapted to be held across the fluid passage P to provide for a differential in pressure at the opposite ends of the passage. The plate 11 is a comparatively thin, substantially round plate, having flat parallel sides and having a central fluid opening 23. The opening 23 is coaxial with the fluid passage P when the orifice plate is in its proper position across the passage. Stops 24 are provided in the lower end of the chamber 17 to stop or hold the orifice plate 11 in a position where its opening 23 is coaxial with the fluid passage P. The stops 24 are spaced at opposite sides of the central vertical axis of the chamber 17 and are in the nature of screws threaded through openings in the plate 17 and welded to the plate as at 26a. The orifice disc or plate 11 is adapted to be passed through the slot 20 and is provided at its upper end with a neck 27 to facilitate its handling and to connect with the operating or shifting means 12 as will be subsequently described.

The plate operating or shifting means 12 is operable to shift the plate 11 between a position across the fluid passage P and a position in the upper end of the chamber 17 where the neck 27 projects through the slot 20. The plate shifting means 12 includes a rotatable stem or screw 28 extending vertically through the upper portion of the chamber 17. The screw 28 is offset laterally from the plate 11 and extends parallel to the plate.

The operating screw 28 is preferably radial relative to the fluid passage P and has a reduced lower end rotatable in a socket 29 in the walls of the chamber 17. A comparatively heavy or coarse thread 30 is provided on the screw 28. The thread 30 has a comparatively heavy pitch and is preferably a square thread. A plain cylindrical part of the screw 28 projects through an opening 31 in the upper wall of the body 10. Suitable packing glands 32 are provided in the opening 31 to seal about the screw 28. The projecting upper end of the screw 28 may be polygonal to facilitate its engagement by a wrench or a suitable turning tool.

A travelling nut 33 is operable longitudinally on the screw 28. The nut 33 may be provided with a screw or pin 34 for cooperating with the thread 30 to cause longitudinal movement of the nut upon rotation of the screw. An upwardly projecting arm 35 is provided on the nut 33 to connect with the upper end of the neck 27. Any suitable detachable connection may be provided between the arm 35 and the neck 27 of the orifice plate. In the particular case illustrated in the drawings, a removable pin 36 extends through transverse openings in the neck 27 and arm 35 to connect the travelling nut 33 with the orifice plate 11. A key or cotter pin 37 may be provided to detachably retain the pin 36 in its connecting position. An enlargement or notch 38 is provided in the slot 20 to pass the arm 35 and a socket 39 is provided in the cover 21 to receive the arm and neck 27 when the plate is shifted to the up position for replacement. It will be apparent how the screw 28 may be rotated to shift the orifice plate 11 between the position illustrated in the drawings and the up position where the neck 27 and arm 35 project into the socket 39. When the plate is in the last named position, the cover 21 may be removed so that the orifice plate 11 may be disconnected from the arm 35 and inspected or replaced.

The mechanical means 13 is operable to clamp the orifice plate 11 against the seat 19 and seal about the orifice plate and is also operable to seal with the seat 19 when the plate is removed. The mechanical clamping and sealing means 13 includes a lock ring or a clamping ring 40 surrounding the fluid passage P and adapted to clamp against and seal with the seal 19 and a side of the orifice plate 11. The outer end of the clamping ring 40 is flat and normal to effectively engage and seal with the annular seat 19 or a side of the plate 11. The clamping ring 40 is carried by an annular housing or carrier 41 mounted on a wall of the chamber 17. The carrier 41 may be attached to the body 10 by suitable screws 42. An annular groove 43 is provided in the inner side of the carrier 41 to carry or hold the clamping ring 40. The clamping ring 40 is threaded into the annular groove 43 so that it is movable axially in the groove upon being turned or rotated.

Gear means is provided for rotating the clamp screw 40 to operate it into and out of clamping engagement with the seat 19 where it seals off the chamber 17 from the fluid passage P. An extension or arm 44 is attached to the upper end of the bracket or carrier 41. A plurality or set of ring gear teeth 45 is provided on the exterior of the clamping ring 40. A pair of meshing pinions 46 is carried by the arm 44. The lower pinion 46 meshes with the gear teeth 45 of the clamping ring 40. The ring gear teeth 45 are sufficiently long to remain in mesh with the teeth of the lower pinion 46 during axial movement of the ring 40. The uppermost pinion 46 is carried by a shaft 47 extending through an opening 48 in the side walls of the body 10. The projecting outer end of the shaft 47 may be polygonal to facilitate turning of the shaft by a suitable wrench or tool. Packing glands 49 may be provided in the opening 48 to seal about the shaft 47. When the orifice plate 11 is in the position illustrated throughout the drawings, the shaft 47 may be rotated in a direction to force the clamping ring 40 against the plate. It will be apparent how turning of the shaft 47 causes turning of the clamping ring 40 and axial movement of the ring in the groove 43. The clamping ring 40 is operable to force the orifice plate 11 against the seat 19 and to clamp against and seal with the other side of the plate. In this manner, the clamping ring 40 is operable to lock the orifice plate in position and to effectively seal about the plate when in position across the fluid passage 11. When the plate 11 is in the upper portion of the chamber 17 clear of the passage P, the ring 40 may cooperate with the seat 19 to seal off the chamber from the passage.

The fluid pressure means 14 is operable to seal with the orifice plate 11 when the plate is in engagement with the seat 19, and is also operable to aid the ring 40 in sealing with the seat 19. In accordance with the invention, the means 14 is carried by the mechanical sealing means and includes a sealing ring 50 slidable in an annular groove 51 in the end of the clamping ring 40. The sealing ring 50 normally has a close or accurate sliding fit in the groove 51 and its outer side is flat to evenly seat against the seat 19 and orifice plate 11. The ring 50 is adapted to be urged into tight effective engagement with the seat 19 or orifice plate 11 by fluid under pressure admitted to the groove 51 behind the ring 50.

In accordance with the preferred construction, the sealing ring 50 is expansible to expand into sealing engagement with the walls of the groove 51 when operated into sealing engagement with the plate 11. A V shaped annular groove 52 is provided in the inner end of the sealing ring 50 and a corresponding shaped ridge 53 is provided on the inner end of the groove 51. The ridge 53 is spaced from the walls of the V shaped groove 52. When the fluid or liquid under pressure is admitted at the back of the sealing ring 50, the ring moves axially forward into pressural and sealing engagement with the seat 19 or orifice plate 11, and the fluid pressure in the V shaped groove 52 expands the inner end of the ring so that it seals with the walls of the groove 51. In practice, the expansion of the sealing ring 50 may be slight, but is sufficient to prevent the leakage of the actuating fluid from around the sealing ring. The V shaped groove 52 provides a large surface on the inner end of the ring 50 to receive the action of the fluid pressure.

A port 54 is provided in the sealing ring 50 and clamping ring 40 and extends between the V shaped groove 52 and the threads at the exterior of the ring 40. The fluid pressure means 14 is adapted to employ a liquid lubricant as its actuating agent or medium and the port 54 is adapted to pass this lubricant to the threads around the clamping ring. The lubricant under pressure thus passed to the screw threads of the clamping ring 40 operates to lubricate the threads and provides an effective liquid seal about the clamping ring. The sealing ring 50 is slackly or loosely connected with the clamping ring 40 to move longitudinally therewith during advancement and retraction of the clamping ring. A plurality of pins 55 project from the clamping ring 40 and extend into spaced openings 56 in the exterior of the sealing ring 50. The pins 55 have loose fits in the openings 56 so that the sealing ring 50 has limited longitudinal movement relative to the clamping ring 40.

The means for supplying fluid under pressure to the fluid pressure sealing means 14 includes a vertical cylinder 60 on the exterior of the body 10. The cylinder 60 is adapted to be filled with a suitable fluid, for example, a liquid lubricant, and a piston or plunger 61 is screw threaded into the cylinder 60. The plunger 61 has a polygonal upper end projecting from the cylinder to facilitate turning of the plunger by a suitable wrench of the tool to put the liquid under pressure. A port or duct 62 extends from the lower end of the cylinder 60 to an annular duct 63 in the seat 19. An annular groove 64 is formed in the end of the sealing ring 50 and openings 65 extend between the groove 64 and the V shaped groove 52, to deliver the liquid under pressure behind the sealing ring. It will be apparent how the liquid under pressure is passed from the cylinder 60 to the V shaped groove 52 to actuate the sealing ring 50 outwardly to pressurely engage and seal with the seat 19 when the clamp ring is engaging the seat 19. One or more openings 26 are provided in the orifice plate to communicate with the grooves 63 and 64. When the plate 11 is clamped against the seat 19 by the ring 40 the fluid or liquid under pressure may be passed through the openings 26 and the other ducts and passages to actuate the ring 50 into pressural and sealing engagement with the plate 11.

The two sealing means 13 and 14 operate to provide an effective fluid tight seal about the plate 11, and the liquid in the sealing means 14 provides a liquid seal for the plate and various parts of the sealing means. To remove the sealing and clamping pressures from the plate 11, the plunger 61 is retracted and the shaft 47 rotated to move the clamp ring 40 out of engagement with the plate 11. The screw 28 may then be rotated to bring the plate into the upper end of the chamber 17. At this time the means 13, and if desired, the means 14 may be actuated to bring the clamping ring 40 and the sealing ring 50 into sealing engagement with the seat 19. This operates to seal off the chamber 17 from the fluid passage P. The cover plate 21 may then be removed and the screw 30 operated to bring the neck 27 and the arm 35 in positions where they project through the slot 20 and are accessible to permit the ready removal of the orifice plate 11.

The polygonal ends of the screw 28, shaft 47 and plunger 61 may be of the same configuration and size so that a single tool or wrench may fit or operatively engage them.

It will be noted that the plate 11 may be removed and replaced without an appreciable loss of pressure from the fluid passage P. The present invention provides an orifice meter fitting in which the orifice plate may be easily and quickly replaced, and a fitting in which tight seals are provided about the orifice plate when it is in position across the fluid passage. The sealing means further operate to provide a fluid tight seal between the passage P and the chamber 17 when the plate 11 is removed from the passage to facilitate the easy and economical replacement of the orifice plate. The sealing means 13 and 14 are of simple, practical construction and consist of a simple, compact arrangement of parts. The active element or sealing ring 50 of the means 13 is carried by the clamping ring 40 so that the two sealing means occupy a minimum amount of space in the fitting and are particularly inexpensive of construction.

Having described only typically preferred forms of my invention, I do not wish to limit myself to the specific details set forth, but wish to reserve to myself any changes or variations that may appear to those skilled in the art or fall within the scope of the following claims.

Having described my invention, I claim:

1. An orifice meter fitting including, a body having a fluid passage, a seat in the body around the passage, a shiftable orifice plate adapted to extend across the passage and engage the seat, means for clamping the orifice plate against the seat and for sealing with the seat when the orifice plate is out of the passage, and fluid pressure means for sealing with the seat.

2. An orifice meter fitting including, a body having a fluid passage, a seat in the body around the passage, an orifice plate shiftable into and out of position across the passage, mechanical means for clamping the plate against the seat when the plate is across the passage and operable to seal with the seat when the plate is out of the passage, and fluid pressure means for sealing with the plate and operable to seal with the seat when the plate is out of the passage.

3. An orifice meter fitting including, a body having a fluid passage, a seat in the body around the passage, a shiftable orifice plate adapted to extend across the passage and engage the seat, means for clamping the orifice plate against the seat and for sealing with the seat when the orifice plate is out of the passage, and fluid pressure means for sealing with the seat including a fluid pressure actuated sealing ring carried by the first mentioned means.

4. An orifice meter fitting including a body having a fluid passage and a chamber intersecting the passage, means for shifting an orifice plate in the chamber into and out of a position across the passage, means for clamping and sealing against the orifice plate when in position across the passage and operable to close off the chamber from the passage when the plate is out of the passage, including a mechanically operable clamping and sealing ring, there being a groove in the ring, and a fluid pressure actuated sealing member slidable in the groove.

5. An orifice meter fitting including a body having a fluid passage and a chamber intersecting the passage, means for shifting an orifice plate in the chamber into and out of a position across the passage, means for clamping and sealing against the orifice plate when in position across the passage and operable to close off the chamber from the passage when the plate is out of the passage including a threaded ring surrounding the passage and operable to cooperate with the plate when it is across the passage and to cooperate with the body around the passage when the plate is out of the passage, there being an annular groove in the active end of the ring, a sealing member in the groove operable to seal with the plate, and means for delivering fluid under pressure to the groove to actuate the sealing member.

6. An orifice meter fitting including a body having a fluid passage and a chamber intersecting the passage, means for shifting an orifice plate in the chamber into and out of a position across the passage, means for clamping and sealing against the orifice plate when in position across the passage and operable to close off the chamber from the passage when the plate is out of the passage including a threaded ring surrounding the passage and operable to cooperate with the plate when it is across the passage and to cooperate with the body around the passage when the plate is out of the passage, there being an annular groove in the active end of the ring, a sealing member in the groove, and means for delivering liquid under pressure to the groove to actuate the sealing member, there being a passage to conduct liquid from the groove to the exterior of the said ring to provide a liquid seal about the ring.

7. A fitting of the character described including, a body having a fluid passage and a chamber intersecting the passage, an orifice plate operable in the chamber between a position across the passage and a position clear of the passage, and sealing means including a carrier adapted to be passed into the chamber and attached to a wall of the chamber, and a screw threaded clamp ring carried by the carrier operable to engage the plate.

8. A fitting of the character described including, a body having a fluid passage and a chamber intersecting the passage, an orifice plate operable in the chamber between a position across the passage and a position clear of the passage, and sealing means including a carrier adapted to be passed into the chamber and a clamping ring carried by the carrier for sealing with the plate when across the passage, and gear means on the carrier for operating the clamp ring.

9. A fitting of the character described including an integral body having a fluid passage and a chamber intersecting the passage, the chamber having a single open end, an orifice plate operable in the chamber between a position across the passage and a position clear of the passage, a carrier adapted to be passed into the open end of the chamber and attached to a wall of the chamber, means on the carrier for clamping the plate in position across the passage, means on the carrier for sealing off the fluid passage from the chamber when the plate is out of the passage, and a closure for the open end of the chamber.

10. A fitting of the character described, including an integral body having a fluid passage and an elongated chamber intersecting the passage and having an open end, an orifice plate operable in the chamber between a position across the passage and a position clear of the passage, an assembly adapted to be passed into the said open end of the chamber and mounted on a wall of the chamber, the assembly including, a carrier, means on the carrier for clamping the plate in position across the passage, and means on the carrier for sealing with the plate, and a plate closing said open end of the chamber.

11. A fitting of the character described including, a body having a fluid passage and a chamber intersecting the fluid passage, there being a slot in the wall of the body at an end of the chamber, an orifice plate, and means for shifting the orifice plate between a position across the passage and a position where it is accessible including a screw, a travelling nut on the screw having a projection, there being a neck on the plate, and a releasable connection between the projection and neck, the plate being operable to a position where the neck and projection extend into the slot so that the connection is accessible.

12. In a device of the character described, a body having an internal seat, a clamping member for engaging the seat, the member having an annular opening, and a fluid pressure actuated sealing ring slidable in the opening and operable to seal with the seat.

13. In a device of the character described, a body having an internal seat, a clamping member for engaging the seat, the member having an annular opening, a sealing ring slidable in the opening and operable by fluid under pressure in the inner end of the opening to seal with the seat, and means for delivering fluid under pressure to the inner end of the opening including a longitudinal passage in the ring and a port in the seat communicating with said passage.

14. In a device of the character described, a body having a fluid passage and a chamber intersecting the passage, a member operable to engage a wall of the chamber to close the chamber off from the fluid passage, and fluid pressure actuated means for sealing with the member and said wall when the member is in engagement with the wall.

15. In a device of the character described, a body having a fluid passage and a chamber intersecting the passage, a member operable to engage a wall of the chamber to close the chamber off from the fluid passage, and a fluid actuated sealing part carried by the member operable to seal with the said wall.

16. In a device of the character described, a body having a fluid passage and a chamber intersecting the passage, a member shiftable across the chamber, means for shifting the member, and a fluid pressure actuated ring carried by the member and surrounding the passage operable to seal with a wall of the chamber to close off the fluid passage from the chamber.

17. In a device of the character described, a body having a fluid passage, a member shiftable across the chamber, means for shifting the member, an axially shiftable sealing ring carried by the member and operable to engage a wall of the chamber to close off the fluid passage from the chamber, and fluid pressure means for actuating the ring.

HENRY H. ROBINSON.